Jan. 15, 1935.  F. RIEBER  1,988,020

POSITION INDICATOR

Filed Nov. 6, 1928  2 Sheets-Sheet 1

INVENTOR
FRANK RIEBER
BY Charles S. Evans
HIS ATTORNEY.

Jan. 15, 1935.　　　　F. RIEBER　　　　1,988,020
POSITION INDICATOR
Filed Nov. 6, 1928　　　2 Sheets-Sheet 2

INVENTOR
FRANK RIEBER
BY Charles S. Evans
HIS ATTORNEY.

Patented Jan. 15, 1935

1,988,020

UNITED STATES PATENT OFFICE 1,988,020

POSITION INDICATOR

Frank Rieber, Berkeley, Calif., assignor to Frank Rieber, Inc., San Francisco, Calif., a corporation of California Application November 6, 1928, Serial No. 317,555

10 Claims. (Cl. 250—1)

My invention relates to a method of and apparatus for determining the distance from a given point of a discontinuity in a wave propagating medium within which the point is located. The method is of general applicability, but it is especially adapted for use with electromagnetic or radio waves.

An object of my invention is to provide a means for determining the distance to the earth from an airship.

Another object of my invention is to provide a means of geophysical exploration.

Still another object of my invention is to provide an apparatus capable of evaluating time intervals of the order of one twenty-millionth of a second for the purpose of determining the distance traveled by an electromagnetic wave in such an interval.

My invention possesses other objects and valuable features, some of which will be set forth in the following description of my invention which is illustrated in the drawings forming part of the specification. It is to be understood that I do not limit myself to the showing made by the said description and drawings, as I may adopt varying forms of my invention within the scope of the claims.

Any discontinuity in a wave propagating medium will reflect a portion of a wave striking it. We may class as discontinuities an abrupt change in medium, e. g., a change from air to water in the propagation of sound waves; or an abrupt or gradual change in the constants involved in the propagation of the waves in a single medium, as the Kennelly-Heaviside layer in the atmosphere which reflects radio waves. The reflection depends for its completeness upon the nature of the discontinuity and the angle of incidence of the wave.

Considered from one standpoint, my broad invention comprises the method of determining the position of a discontinuity in an electromagnetic wave propagating medium which involves generating an electromagnetic wave in the medium and evaluating the time required for that portion of the wave reflected by the discontinuity to arrive at a known point. From another standpoint my broad invention comprises the steps of generating a train of waves in any wave propagating medium, followed after an interval by a second train, and adjusting the interval between the trains so that the arrival at a given point of that portion of the first train reflected by the discontinuity coincides with the arrival of an unreflected portion of the second train. The trains may be of different frequencies, and their coincidence may be determined by detecting their beat frequency. The position of the discontinuity is determined from the known interval between the trains and their known speed of propagation.

Referring to the drawings.

Figure 1:
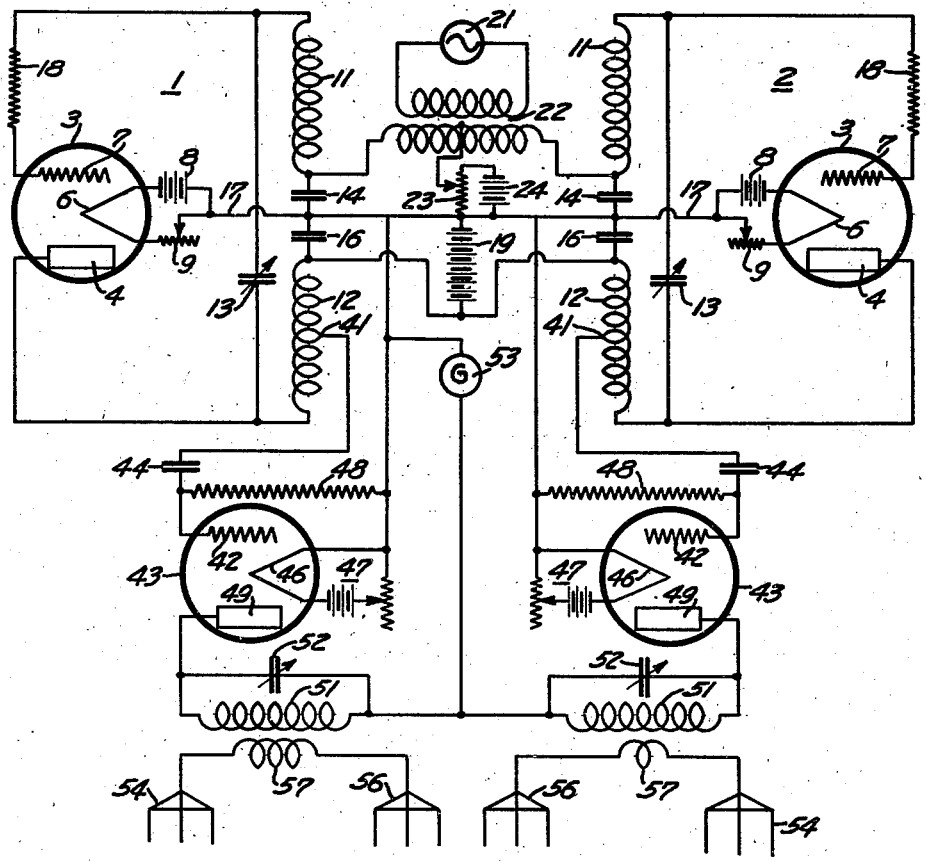
Figure 1 is a circuit diagram of the wave generating portion of a radio-altimeter embodying my invention.
Figure 2:
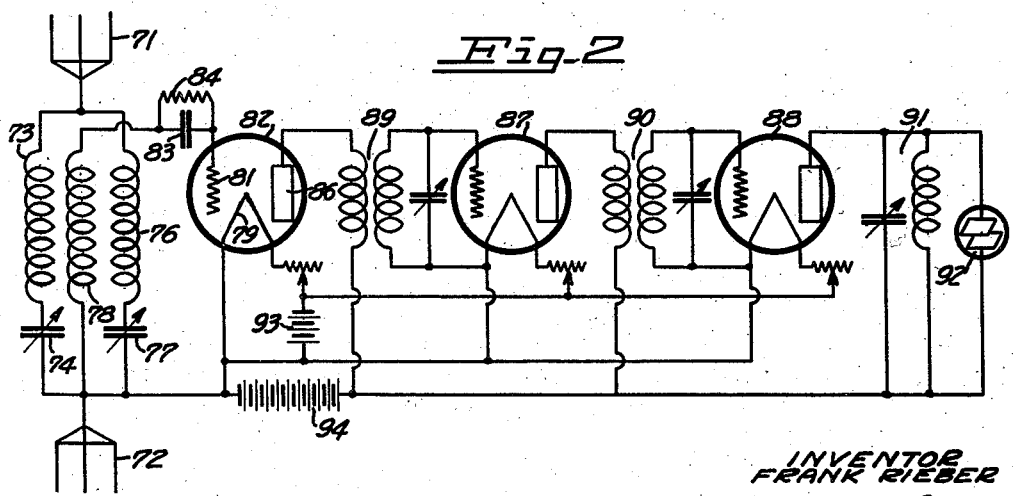
Figure 2 is a similar diagram of the wave detecting portion of the radio-altimeter.

An embodiment of my invention particularly adapted for use as a radio-altimeter for aircraft comprises a pair of vacuum tube oscillators which are indicated in the drawing by the general reference characters 1 and 2. Except for the fact that they operate at different frequencies these oscillators are similar, each including a vacuum tube 3 having an anode or plate 4, a cathode 6 and a grid 7. A battery 8 and a rheostat 9 are provided for heating the cathode. The oscillating circuit comprises a grid coil 11 and a plate coil 12 tuned by a variable condenser 13. Two by-pass condensers 14 and 16, in series, connect the plate and grid coils, and a lead 17 connects from the junction between these condensers to the cathode or filament circuit. In series with the grid of the tube is a high resistance 18.

Plate current is supplied to both oscillators by a battery or other source of direct potential 19 connected in parallel with the by-pass condensers 16.

A control oscillator 21 supplies a relatively high alternating potential of a lower frequency than that generated by either of the oscillators 1 and 2. This oscillator is preferably also a vacuum tube oscillator of any conventional type, and it feeds a transformer 22. The ends of the secondary of this transformer are connected to the grid sides of the condensers 14. The transformer secondary has a center tap which is connected to the adjustable contact of a potentiometer 23 bridged across a battery 24, the positive end of the battery being connected to the filament circuit. The potentiometer is the only control used in taking readings with the device, and is preferably calibrated in distance.

Figure 3:
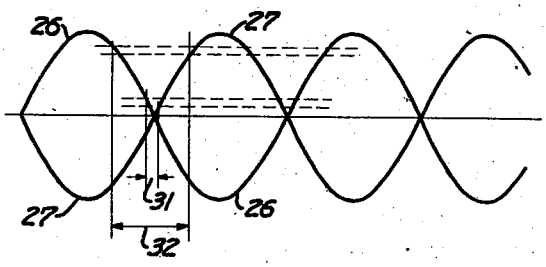
Figure 3 is a diagram showing the form of the control wave which is used to regulate the interval between the wave trains.

The operation of this portion of the apparatus is as follows: Each of the oscillators 1 and 2 is operative over a limited range of grid potentials, e. g., from 0 to —5 volts. The oscillator 21 is operative to swing the grids 7 thru a much wider range of potentials, say ±1000 volts. Since the grids of the two oscillators are connected in opposite phase relation to the control oscillator their potentials vary as is shown in Figure 3, curve 26 representing the control potential on the grid of oscillator 1, and curve 27 that of oscillator 2. To these alternating control potentials is added an adjustable direct potential from the battery 24.

If the potentiometer is adjusted to supply —5 volts direct potential to the grids, it is obvious that oscillator 1 will operate only while the control oscillator potential curve 26 is falling from 5 to 0 volts or rising from 0 to 5 volts, and that oscillator 2 will operate only while the curve 27 is varying thru a similar range. It is further obvious that the two oscillators will come into action in immediate succession, but not simultaneously, and will each emit a short train of waves. These wave trains, which we may designate train A from oscillator 1 and train B from oscillator 2, are represented by curves 28 and 29 respectively. (See Figure 4.)

If the negative direct potential is increased slightly by adjusting the potentiometer there will be a slight interval between the wave trains, as indicated at 31, Figure 3. Should the negative direct potential be further increased, say to 700 volts, the interval between the trains will be further increased, as shown at 32, the oscillators being operative only while the control potentials are varying between 700 and 695 volts. The maximum interval between the wave trains is equal to one half the period of the control oscillator.

Thus, if the control oscillator operates at a frequency of 16,000 cycles per second, the maximum interval between the beginning of successive trains of oscillations will be 1/32,000 second. As we have assumed 1000 as the peak voltage of the control oscillator, and shall also assume a sine wave form, the minimum interval, corresponding also to the period of the wave trains, will be the period required by the oscillator to traverse an electrical angle equal to arc sin 5/1000, or .29°. This corresponds to .29/360×1/16,000 second, or approximately 1/20,000,000 second. Assuming that oscillator 1 operates at 200,000,000 cycles, and oscillator 2 at 300,000,000 cycles, this corresponds to trains of 10 and 15 waves respectively. Owing to the sinusoidal form of the control potential wave, the length of the trains increases somewhat with the interval between the trains. The interval may also be varied by changing the frequency of the control oscillator.

An extremely high positive potential will at times be impressed upon the oscillator grids, and this would result in excessive and possibly destructive grid current were it not for the resistors 18. A soon as a grid current starts to flow there is a potential drop across these resistors which keeps the grid current and voltage within reasonable limits.

Returning to the structure of the apparatus as shown in Fig. 1, coil 12 of oscillator 1 is provided with a tap 41 to which the grid 42 of an amplifier tube 43 is connected thru a blocking condenser 44. The cathode 46 of the amplifier tube is provided with the usual filament supply circuit 47 which is directly connected with the filament circuit of the tube 3, and is also connected with its own grid thru the leak 48. The plate 49 of the amplifier is connected to a tuned circuit comprising a coil 51 and condenser 52. Plate current is supplied to the amplifier by a suitable generator 53. A radiating circuit, exemplified by the antenna 54 and counterpoise 56 is coupled to the tuned circuit by a coil 57.

Oscillator 2 may be provided with a similar amplifier as shown, but it is usually desirable to make this amplifier of lower power and to reduce its radiation efficiency. It is frequently advisable to enclose the transmitting equipment in the same cabinet with the receiving equipment next to be described, and under these circumstances the amplifier and radiator apparatus for oscillator 2 may be omitted entirely, sufficient radiation being obtained from the oscillator coils themselves.

The receiving portion of the apparatus comprises pick-up circuits which are responsive to the waves emitted by both of the oscillators 1 and 2. An antenna 71 and counterpoise 72 are connected to two circuits in parallel, the first, consisting of the inductor 73 and the condenser 74, being tuned to wave A, and the second, consisting of the inductor 76 and the condenser 77, being tuned to wave B. A coil 78, coupled to both of these circuits, is connected to the filament 79 and grid 81 of a detector tube 82, thru the grid condenser 83 and leak 84. The plate 86 of the detector feeds a tuned high frequency amplifier, comprising the tubes 87 and 88, and the intertube coupling circuits 89 and 90. The output circuit of the amplifier comprises the tuned circuit 91, about which is shunted an indicator, such as the neon lamp 92. The circuits 89, 90 and 91 are all tuned to the difference or beat frequency of waves A and B. The usual filament battery 93 and plate battery 94 supply power for the receiver.

Figure 4:
Figure 4 is a wave form diagram showing the received wave trains and their resultant currents.
Figure 4:
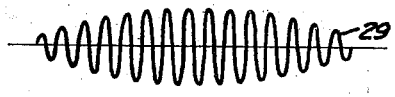

In operation, the transmitter emits the waves A and B, represented by curves 28 and 29 of Fig. 4, successively. Neither of these waves alone can affect the indicator 92, since the receiving amplifier is tuned to reject these frequencies, and wave A will have traveled past the receiving antenna by the time wave B reaches it. If, however, the transmitter and receiver are at such a distance from a discontinuity in the wave propagating medium that a portion of wave A reflected by the discontinuity arrives at the receiver simultaneously with wave B, the two waves will affect the detector to produce a beat frequency component which may be represented by curve 96 of Fig. 4. This component is accepted by the amplifier, and produces an indication in the neon lamp 92.

Figure 5:
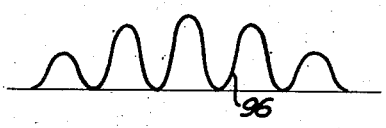
Figure 5 is a diagram showing the wave paths where the transmitting and receiving portions of the apparatus are separately located.
Figure 5:
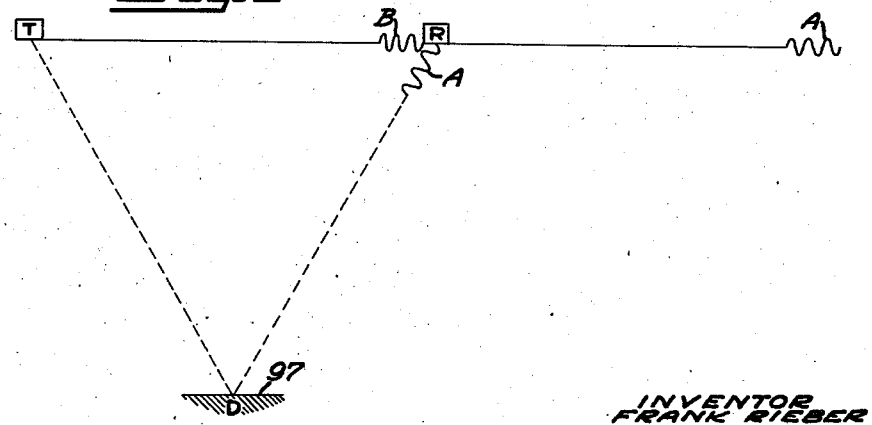

Figure 5 shows the wave paths which cause this effect. The transmitter T and receiver R are shown rather widely separated, but it is apparent that the same effect will occur regardless of the distance between them. The waves are successively emitted by the transmitter, and, as will be seen, the wave A has traveled past the receiver along the line TR by the time the wave B reaches R. Another portion of the wave, which is represented in the diagram as A', has passed downward to the discontinuity 97 where it has been reflected back to the receiver along the path TDR to arrive simultaneously with the wave B, which sensitizes the receiver for its reception.

By manipulating the transmitter an interval may always be found such as to produce the simultaneous arrival of the waves. Since the speed of electromagnetic waves is known, (300 million meters per second) the interval between the waves A and B may be directly evaluated in terms of distance. Thus, assuming the transmitter and receiver to be contiguous, the minimum interval mentioned above, 1/20,000,000 second, would correspond to a wave path of 15 meters, or a distance from the apparatus to the discontinuity of 7.5 meters (24.6 ft.), since the wave must traverse this distance twice. The maximum interval considered above, or 1/32,000 second, corresponds to a distance to the discontinuity of 4690 meters, or about 3.2 miles. Where the receiving and transmitting apparatus are separated, the distance indicated will be the difference in the length of the wave paths, from which the actual distance to the discontinuity may be obtained indirectly.

Owing to the nature of the control potential, the waves will be emitted in groups in the order ABBA, ABBA, the trains joined by the vinculum being those whose beats give the desired indication. Since the B wave is much weaker than the A wave, and since the reflected wave is always much attenuated by distance, the BA beat is so weak as to give no distinguishable indication. There is a possible source of error in that the arrival of the A train may coincide with the arrival of the second B train of the group instead of the first. This will give too small an apparent distance; in case of a multiple indication, the larger distance is the correct one. In a radio-altimeter, this means that an incorrect reading is always on the side of safety.

In the disclosure herein given, the invention has been reduced to the simplest possible terms. It is recognized that other forms of oscillator than that shown may be desirable, and that it would also probably be of great advantage to use shield-grid tubes and fully shielded amplifier construction thruout. Such refinements, however, are well known in the art, and they are not shown here since their inclusion would greatly confuse both drawings and specification.

Aside from its use as a radio-altimeter, my invention is of value in geophysical exploration, since ore bodies and oil bearing strata offer discontinuities which will give reflections. In this case, high power and longer waves than those mentioned above will ordinarily be required, on account of the high attenuation of such waves in the earth.

I claim:

1. The method of determining the position of a discontinuity in a wave propagating medium which involves the steps of generating trains of waves of different frequencies at known intervals, and varying the intervals to make the arrival time at a known position of that portion of one of the trains reflected by the discontinuity coincide with that of an unreflected portion of the other train.

2. The method of determining the position of a discontinuity in a wave propagating medium which involves the steps of generating trains of waves of different frequencies at known intervals, varying the intervals to make the arrival time at a known position of that portion of one of the trains reflected by the discontinuity coincide with that of an unreflected portion of the other train, and detecting the beat frequency between said wave trains.

3. The method of determining the position of a discontinuity in a wave propagating medium which involves the steps of generating alternately trains of waves of two frequencies at known intervals, and varying the intervals to make the arrival time at a known position of that portion of one of the trains reflected by the discontinuity coincide with that of an unreflected portion of the other train.

4. The method of determining the position of a discontinuity in a wave propagating medium which involves the steps of generating a relatively strong wave train, generating a weaker wave train after an interval, and varying said interval to make the arrival of the weaker train at a known position coincide with the arrival of that portion of the stronger train reflected by the discontinuity.

5. The method of determining the position of a discontinuity in a wave propagating medium which involves the steps of generating a relatively strong wave train, generating a weaker wave train after an interval, varying said interval to make the arrival of the weaker train at a known position coincide with the arrival of that portion of the stronger train reflected by the discontinuity, determining the coincidence of arrival by detecting the beat frequency between the trains, and determining the position of the discontinuity from the magnitude of the interval.

6. An apparatus for determining the position of a discontinuity in a wave propagating medium, comprising means for alternately generating waves of two frequencies, means for indicating the period of generation, means for receiving said frequencies, and indicating means operated by said receiving means responsive to the simultaneous arrival of waves of both of said frequencies, whereby a difference in length of path of said waves is indicated by their simultaneous actuation of said indicating means.

7. An apparatus for determining the position of a discontinuity in a wave propagating medium, comprising a pair of wave generators of different frequencies, means for controlling said generators to produce said frequencies alternately, means for indicating the period of generation, means for receiving said frequencies, and an indicator operated by said receiving means responsive to the simultaneous arrival of both of said frequencies, whereby a difference in length of path of said waves is indicated by their simultaneous actuation of said indicating means.

8. An apparatus for determining the position of a discontinuity in a wave propagating medium, comprising means for generating a train of waves, means operative after a known interval for generating a second train of waves, receiving circuits responsive to the frequencies of each of said wave trains, a detector coupled to said receiving circuits, an output circuit for said detector selectively responsive to the beat frequency of said waves, and an indicator operated by said output circuit.

9. An apparatus comprising a pair of wave generating oscillators of different frequencies, a control oscillator arranged to block the operation of each of said generating oscillators during a portion of the control oscillator cycle, and means for varying the portion of said cycle during which each of said generating oscillators is operative.

10. An apparatus for determining the position of a discontinuity in a wave propagating medium, comprising a pair of vacuum tube oscillators for generating waves of different frequencies, a control oscillator coupled to the grids of said generating oscillators and operative to block each of said generating oscillators during portions of its cycle and permit their successive operation during other portions of its cycle, means for varying the interval between the portions of the cycle in which the generating oscillators are operative, and means for indicating the simultaneous arrival of the generated waves.

FRANK RIEBER.